(12) United States Patent
Zhang et al.

(10) Patent No.: US 6,295,160 B1
(45) Date of Patent: Sep. 25, 2001

(54) BROAD TUNING-RANGE OPTICAL PARAMETRIC OSCILLATOR

(75) Inventors: Kevin Dapeng Zhang, Vista; Eli Margalith, Solana Beach, both of CA (US)

(73) Assignee: Opotek, Inc., Carlsbad, CA (US)

( * ) Notice: Subject to any disclaimer, the term of this patent is extended or adjusted under 35 U.S.C. 154(b) by 0 days.

(21) Appl. No.: 09/250,721

(22) Filed: Feb. 16, 1999

(51) Int. Cl.$^7$ .................................................. G02F 1/39
(52) U.S. Cl. ................................................... 359/330
(58) Field of Search .................. 359/326–332; 372/21, 22

(56) References Cited

U.S. PATENT DOCUMENTS

| | | | |
|---|---|---|---|
| 4,408,329 | * 10/1983 | Ferguson | 372/21 |
| 5,276,548 | * 1/1994 | Margalith | 359/330 |
| 5,661,595 | * 8/1997 | Stamm et al. | 359/330 |
| 5,781,571 | * 7/1998 | Nabors et al. | 372/21 |
| 5,812,305 | * 9/1998 | Blake et al. | 359/330 |

* cited by examiner

Primary Examiner—John D. Lee
(74) Attorney, Agent, or Firm—John R. Ross, III; John R. Ross

(57) ABSTRACT

An optical parametric oscillator for converting the wavelength of a laser pump beam into a signal wavelength and an idler wavelength. A co-linear double resonance cavity is created with a right angle prism serving as a maximum reflector for both the pump beam as well as the signal and idler beams. A non-linear crystal is positioned within said resonance cavity and is pivoted to tune the oscillator. A pump beam deflector is positioned to deflect the pump beam into the resonance cavity. The deflector preferably is a mirror with a multi-layer coating configured to provide maximum reflection at the wavelength of the pump beam and maximum transmittal of the signal and idler beams over their ranges. The pump beam passes twice through said non-linear crystal and is efficiently converted into said signal and idler beams in said non-linear crystal. The deflector can be placed inside or outside the cavity. In a preferred embodiment the output coupler is an uncoated window.

26 Claims, 2 Drawing Sheets

BROAD TUNING-RANGE OPTICAL PARAMETRIC OSCILLATOR

The present invention relates to the general art of non-linear optical frequency conversion techniques, and in particular to means for increasing the wavelength tuning range and conversion efficiency of Optical Parametric Oscillators.

BACKGROUND OF THE INVENTION

An Optical Parametric Oscillator (OPO) is a device employing a non-linear crystal which when pumped by a laser can generate coherent light whose wavelength can be varied continuously over a wide range. In the OPO the non-linear crystal (such as $BaB_2O_4$, $LiB_3O_5$, $LiNbO_3$, $KTiOPO_4$ and others) is placed in an optical resonator. When a laser beam, at a wavelength $\lambda_p$, is directed to propagate through the crystal, a pair of variable wavelength beams are produced. Energy is conserved so:

$$\frac{1}{\lambda_p} = \frac{1}{\lambda_s} + \frac{1}{\lambda_i} \qquad (1)$$

By convention, the laser wavelength, $\lambda_p$, is dubbed as the pump beam, the wavelength $\lambda_s$ is referred to as the signal wavelength and $\lambda_i$ is the idler wavelength, where the signal has a shorter wavelength than the idler ($\lambda_s<\lambda_i$). The wavelengths of these beams can be tuned over a wide spectral range by varying the orientation of the crystal with respect to the laser beam, by changing the crystal's temperature, or by applying a variable voltage across the crystal. Various tuning ranges can be achieved by properly selecting the laser, the non-linear crystal, and the optical components.

Under typical operating conditions, the initial generation of the parametric beams (the idler and the signal) is inefficient and only a small fraction of the pump beam is converted after a single pass through the crystal. The efficiency is significantly improved by oscillating one or both of the parametric beams such that it (or they) are amplified in successive passes through the crystal(s). The oscillator is comprised of optical elements designed to provide the required feedback for efficient conversion. The principles of OPO are well known and described in texts on lasers and non-linear optics (for example, A. Yariv, Quantum Electronics, $3^{rd}$ edition, p. 411. John Wiley & Sons, New York).

The performance of an OPO is characterized by various parameters such as wavelength tuning range, conversion efficiency, spectral line width and beam quality. Other attributes such as low cost, long-term stability, robust design and ease of operation are important in making the OPO a practical device. For a given pump beam, the design of the oscillator dictates the performance of the OPO.

Various constrain affect the design, and therefore the performance of presently available OPO devices. Most importantly, the desire to simultaneously achieve high conversion efficiency while enabling wide wavelength tunability imposes conflicting design demands that lead to tradeoff and result in compromised performance. The tuning range defines the versatility of the OPO and the conversion efficiency is strongly related to the practicality of the device. The most attractive feature of the parametric process is the potential for generating a widely tunable, high quality laser beam. The tuning of an OPO is in general dictated by the characteristics of the selected non-linear crystal (e.g., non-linear coefficient, birefringency, transmission and physical size) and the design of the coating of the associated cavity optics.

Enabling wide wavelength tuning requires, in prior art devices, that the oscillator incorporates optics with multi-layer dielectric coatings that have to satisfy complex requirements for reflectivity and transmission at the pump, signal, and idler wavelengths. Coatings that can satisfy the requirements for a wide tuning range are difficult and sometime impossible to fabricate. Each tuning range requires custom coatings and therefore these optics are not readily available for many ranges and they tend to be expensive. Moreover, the multi-layer coatings have relatively low optical damage threshold, which limits the pump intensity and adversely affect the conversion efficiency of the OPO.

Conversion efficiency is defined as the ratio of the output energy of the OPO beam (signal or idler) to the energy of the laser (pump) beam. The conversion efficiency of an OPO is associated with complex and inter-related design parameters, most importantly: oscillator design, pumping configuration and cavity length.

Oscillation

The oscillator can be designed to oscillate either one of the parametric beams (Single Resonance Oscillator, SRO) or both of them (Double Resonance Oscillator, DRO). The DRO design provides lower threshold and higher conversion efficiency whereas the SRO design offer advantages in special applications such as narrow-line operation. Although the DRO is usually the preferred configuration for high power OPO's, it is difficult to manufacture coatings for DRO's that will operate over a wide spectral range.

Pumping Configuration

The optical parametric process requires that the signal and idler beams propagate approximately along the same direction as the pump beam. In simple OPO designs the pump beam traverses the crystal only in one direction whereas the parametric beam oscillate back and forth. In this case the interaction between the pump and the parametric beams is limited to only half the time the parametric photons are oscillating inside the cavity, resulting in low conversion efficiency. To maximize efficiency, OPO's have been designed such that the pump beam as well as the parametric beams will transverse the crystal more than once. This can be achieved in a ring oscillator design (such as that described in U.S. Pat. No. 5,276,548) or by retro reflecting the pump beam after it has passed through the crystal to create what is known as a double pump oscillator (DPO). (See, for example, Brosnan, Optical Parametric Oscillator Threshold and Linewidth Studies. IEEE JQE Vol.15, No 6, June 1979; Guyer, U.S. Pat. No. 5,079,445; Nabor, U.S. Pat. No. 5,781,571 and Harlamoff, U.S. Pat. No. 5,406,409).

In prior art linear cavity designs, additional optics are typically positioned inside the cavity in order to retro reflect the pump beam. In the configuration presented in U.S. Pat. No. 5,406,409, the pump beam is retro reflected by a mirror (transparent to the signal and idler beams) placed inside the cavity. In the configuration presented in U.S. Pat. No. 5,781,571 the retro reflecting mirror is outside the cavity, but an additional turning mirror (transparent to the signal and idler beams) is placed inside the cavity. In U.S. Pat. No. 5,781,571 an OPO cavity incorporates a right angle prism; however, the prism reflects only the signal beam to form an SRO in a non-collinear configuration. The prism is not used to reflect either the pump or idler beams.

Cavity Length

The typical pump laser emits its energy in a very short pulse. The short duration of the pulse limits the interaction time between the parametric beams (signal and idler) and the pump beam. Therefore, it is crucial that the overall length of the cavity will be minimized in order to maximize this interaction time, and thus the conversion efficiency.

A device that is designed to operate as both DRO and DPO is the most efficient in converting pump energy to desired output at the signal and idler wavelengths. However, as stated above, it is impractical to fabricate multi-layer coatings that can satisfy the reflectivity and transmission demands across a broad spectral band including the pump, signal and idler wavelengths. Multiple sets of coated mirrors are required in prior art designs to cover a wide tuning range. Thus, the potential advantages of the DRO/DPO system is offset by the compromised performance of the resonator mirrors.

What is needed is a practical OPO with high conversion efficiency and with extended tuning range that can be manufactured from readily available optical materials at low cost.

SUMMARY OF THE INVENTION

The present invention provides an optical parametric oscillator for converting the wavelength of a laser pump beam into a signal wavelength and an idler wavelength. A co-linear double resonance cavity is created with a right angle prism serving as a maximum reflector for the pump signal and idler beams. A non-linear crystal is positioned within said resonance cavity and is pivoted to tune the oscillator. A pump beam deflector is positioned to deflect the pump beam into the resonance cavity. The deflector preferably is a mirror with a multi-layer coating configured to provide maximum reflection at the wavelength of the pump beam and maximum transmittal of the signal and idler beams over their wavelength ranges. The pump beam passes twice through said non-linear crystal and is efficiently converted into said signal and idler beams in said non-linear crystal. The deflector can be placed inside or outside the cavity. In a preferred embodiment the output coupler is an uncoated window and the right angle prism is coated with a single layer anti-reflective coating.

DETAILED DESCRIPTION OF PREFERRED EMBODIMENT

First Preferred Embodiment

Figure 1:
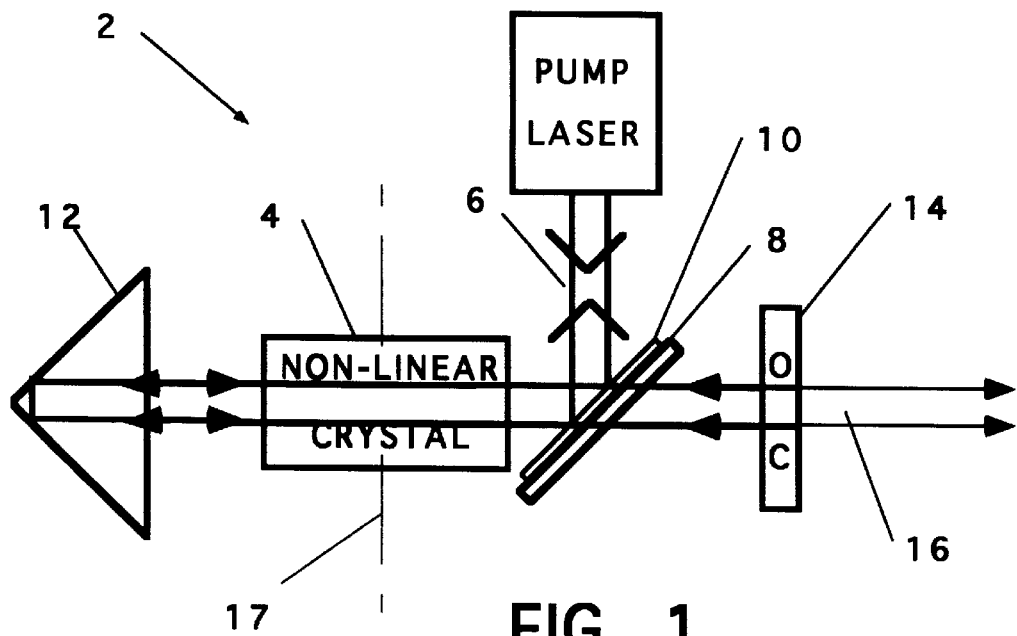
FIG. 1 is a drawing showing a first preferred embodiment in which a right angle prism is used as a retro-reflector for the pump, signal, and idler beams. The pump beam is coupled into the resonator by a mirror, placed within the OPO cavity. The output coupler is an uncoated window.

A first preferred embodiment of the present invention is shown in FIG. 1. It is a broad tuning range optical parametric oscillator 2. Its elements are a BBO crystal 4 (available from suppliers such as CASIX with offices in Chatsworth, Calif.) measuring 6×8×10 mm and cut at an angle of 27,5 degrees with respect to its optic axis for type-I phase matching. The pump beam 6 is the third harmonic of a Nd:YAG pump laser at 355nm. The laser is a commercial laser the "Brilliant" model supplied by Quantel SA, France. The pump beam 6 is coupled into the resonance cavity with pump coupling mirror 8 which is coated on its front side with a multilayer coating 10 (provided by suppliers such as CVI with offices in Albuquerque, N. Mex.) to provide high reflectivity at the S polarized pump wavelength at 355 nm. The coating is designed to be highly transmitting of P polarized signal and idler beams. One such preferred coating is know as a V or notch coating and is simple to manufacture for reflecting a fixed shorter wavelength and transmitting a broad band longer wavelength. The back surface of mirror 8 is in this embodiment uncoated. The resonance cavity is formed by output coupler 14 and prism 12. Output coupler 14 is a flat sapphire window 1 inch in diameter and ⅛ inch thick with both surfaces polished and parallel to each other to better than 10 seconds of arc, such that normal incidence reflections from each surface propagate co-linearly. In this embodiment neither side of optic 14 is coated. The combined reflection from both surfaces is about 15 percent across the entire tuning range for the signal beam and for the idler beam. Prism 12 is a ½-inch knife edge right-angle prism that is sufficiently precise (i.e., 90 degrees +/−30 arc seconds) to reflect an incident beam back along its original direction, by total internal reflection within the prism. The hypotenuse is coated with a single layer anti-reflective coating to minimize reflection. Suitable prisms are routinely fabricated in the optics industry. The important aspect of this prism is that the retro-reflection is independent of wavelength and therefore it reflects the pump and both parametric beams (idler and signal) back to the OPO crystal. The oscillator is tuned by pivoting crystal 4 about a pivot axis 17 as shown in FIG. 1. By pivoting crystal 4 the signal wavelength can be tuned between 405 and 710 nm with corresponding values of idler wavelength of between 2600 to 710 nm. Beams 16 consist of the signal beam and the idler beam. The wavelengths of these beams are predominately determined by the pivot angle of crystal 4. The signal beam can be separated from the idler beam with beam splitters, filters, polarizers, or dispersion optics using well known prior art techniques as explained in detail in the above references. A prototype device fabricated by the Applicants according to FIG. 1 generated an output energy of 54 mJ (signal and idler combined) when pumped with the third harmonic (355 nm) of a Q-switched Nd:YAG laser (manufactured by QUANTEL, with offices in France). The pump energy at 355 was 95 mJ with a pulse width of 5 ns and a repetition rate of 10 Hz.

Second Preferred Embodiment

Figure 2:
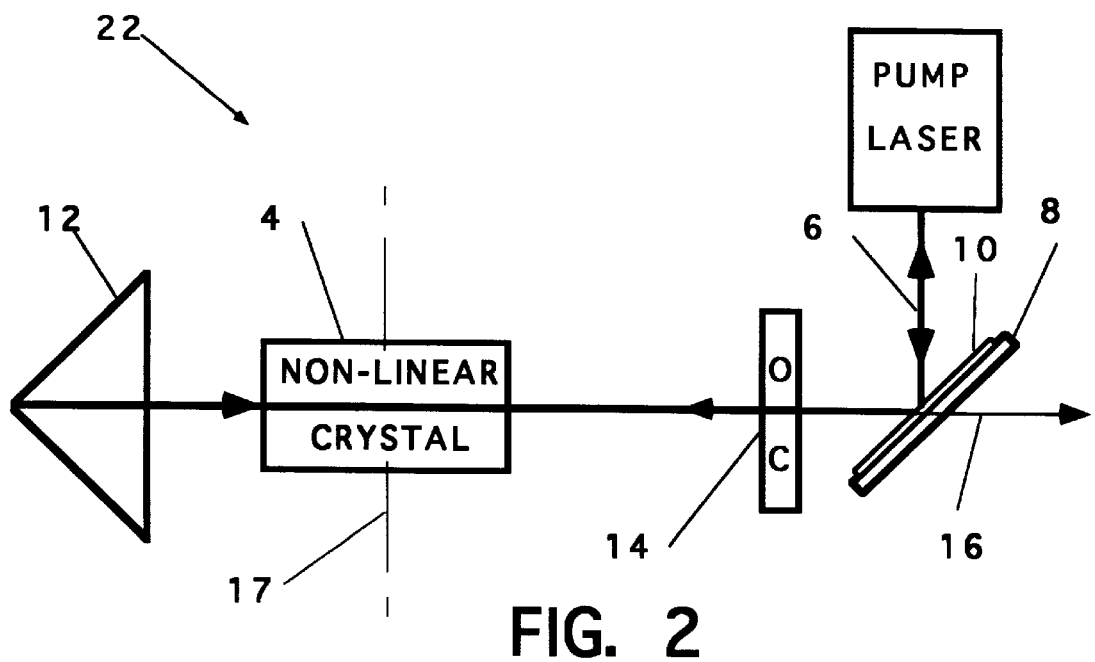
FIG. 2 is a drawing showing a second preferred embodiment in which a right prism is used as a retro-reflector for the pump, signal, and idler beams. The pump beam is coupled into the resonator by a mirror, placed outside the OPO resonator. The output coupler is an uncoated window.

A second preferred embodiment of the present invention is shown in FIG. 2. This is the same as the embodiment shown in FIG. 1 except the pump beam 6 is coupled into the OPO cavity by passing through the output coupler 14. In FIG. 2 the pump beam 6 is reflected off mirror 8 placed outside the OPO cavity, behind the output coupler 14. Mirror 8 is coated on its front surface to maximum reflect the pump wavelength while allowing maximum transmission of the signal and idler wavelengths. Signal and idler beams 16 pass through mirror 8 and can be separated using well known prior art techniques according to the needs of particular applications. A prototype of this embodiment produced substantially the same results as the prototype of the first embodiment. An important advantage of this embodiment is that, when output coupler 14 is uncoated, the OPO resonator contains no wavelength-specific elements, and is independent of the pump wavelength. Thus, pump lasers of different wavelengths can be used with the same OPO, by exchanging the pump laser and coupling mirror 8.

Other Embodiments

Figure 3:
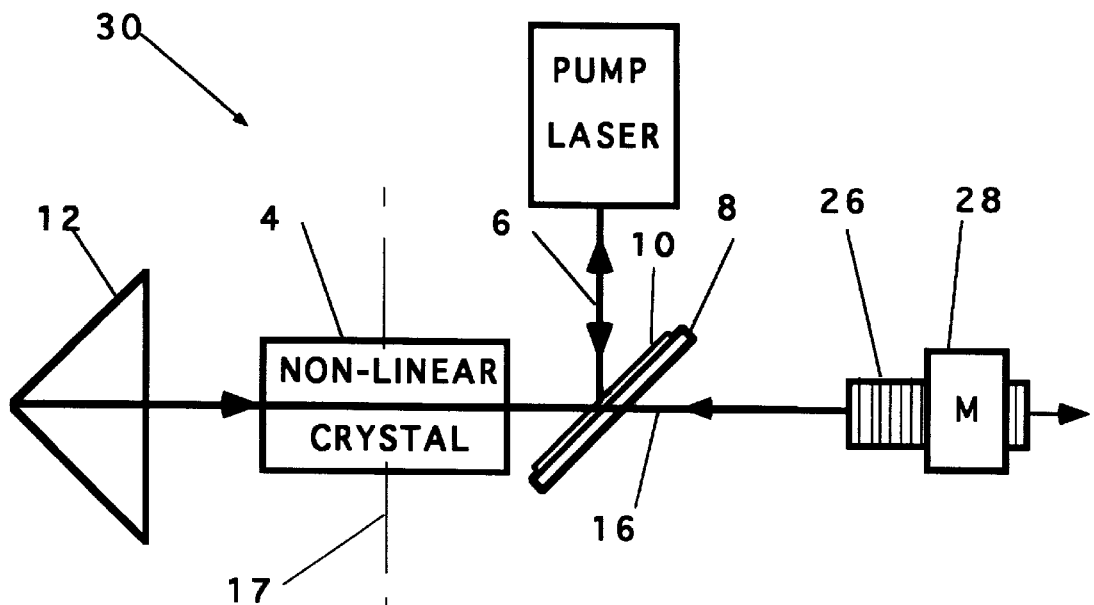
FIG. 3 shows a preferred embodiment with a grating and a mirror in a Littman configuration, which replaces the output coupler and serves as a line narrowing element.
Figure 4:
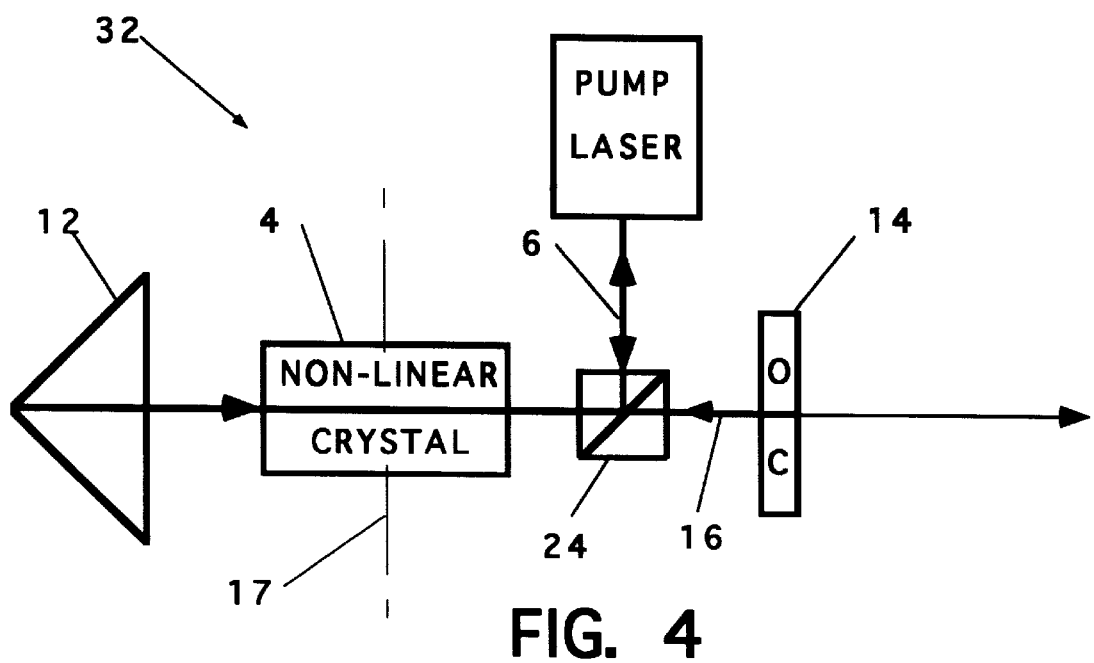
FIG. 4 shows a preferred embodiment similar to FIG. 1 with a polarizing cube replacing the beam splitter.

Two other embodiments of the present invention are shown in FIGS. 3 and 4. In the FIG. 3 embodiment 30, the output coupler of FIG. 1 is replaced by grating 26 and mirror 28 in Littman configuration. (M. Littman, Single-mode operation of grazing incident pulsed dye laser, Optics Letters, Vol. 3, p.138, 1978) The output of the OPO is spectrally narrowed. In the FIG. 4 embodiment, a polarizing cub 24 replaces the pump-coupling mirror 8. In type-I phase matched OPO operation, the pump beam is orthogonally polarized to both the signal and the idler beams. The polarizing cube 24 will transmit both the signal and idler beams while reflecting the pump beam, which serves the same purpose as the pump coupling mirror 8. The polarizing cube 24 can also replace mirror 8 in the FIG. 2 embodiment for the same reason.

Advantages of Right Angle Prism

Incorporating a right angle prism as a reflector for all the three beams in the cavity offers significant advantages as it permits in a simple design both double resonance oscillation (DRO) and double pump oscillation (DPO). Furthermore, since reflection inside the prism is based on total internal reflection, it is independent of wavelength; therefore, the use of the prism enables wide wavelength tuning without the need for multi-layer dielectric coatings which tend to have low damage thresholds, are relatively expensive, and limit the tuning range.

The prism permits substantial design simplification as compared to the prior art. The need for a separate pump beam reflector is eliminated and the same turning mirror that directs the pump beam into the oscillator also directs it out.

Advantages of Uncoated Output Coupler

The use of an uncoated optical element as the output coupler offers the following advantages: It provides feedback for both parametric beams, the signal and the idler; thus the OPO operates as a DRO. It is a simple and inexpensive optical element with wavelength independent reflectivity and a relatively high damage threshold.

Advantages of the Present Invention

The invention presents significant advantages over presently available Optical Parametric Oscillators. The invention offers unique implementation of simple and readily available optical components to form an efficient and practical Optical Parametric Oscillator.

The oscillator is designed to operate as a Double Resonance Oscillator (DRO) whereas both signal and idler beams are reflected to traverse back and forth through the non-linear crystal(s) within the cavity. It is also designed to operate as a double-pumped oscillator (DPO) by reflecting the pump back after a first pass through the crystal(s) such that it traverses the crystal(s) in both directions.

The novelty of the invention is that all these features are achieved with a minimal number of optical elements and that the device can be implemented to operate over a very wide range of wavelengths. The device is very easy to assemble and operate and is significantly less expensive to build than any prior art OPO.

The conversion efficiency of the oscillator in this invention is similar to the efficiency obtained in a ring oscillator cavity (such as presented by E. Margalith), however, at a much lower cost and a significantly simpler configuration.

The basic principle of the invention is an oscillator that is comprised of two readily available optical elements: a right angle prism, and an uncoated flat optical element (window, substrate).

The desired reflectivity of the output coupler is related to the gain, which is a function of the pump intensity. By adjusting the gain (e.g. changing the pump beam diameter) to match the reflectivity of available materials, one can optimize the operation conditions of the oscillator. Other optical materials such as fused silica were also tested in the configuration of the preferred embodiments and they generated similar results.

The pump can be injected into the cavity either directly through the output coupler (FIG. 2) or by placing a dichroic mirror that reflects the pump wavelength and transmits the signal and idler wavelengths inside the cavity (FIG. 1). The first case is preferred for Type II OPO in which one of the parametric beams has the same polarization as the pump. The second case may be preferred for a type I OPO as it present the lower losses to the pump beam.

There may be cases where it will be desired to use an output coupler that will be coated to reflect the signal and/or the idler beam to meet special operation requirements. Such design is within the scope of this invention.

The principle of this invention includes designs to narrow the spectral linewidth of the OPO. Optical elements such as prisms, refraction gratings, and etalons can be used separately or in conjunction with one another, to narrow the spectral linewidth of the signal or the idler. Narrow line output can also be achieved by injecting into the oscillator a spectrally narrow beam, at the frequency of the signal or the idler.

A few configurations of the principle design are presented in this patent. Other arrangements, in accordance with the spirit of the designs presented, can be chosen to perform as well.

The design described in this invention enables simple integration of the OPO apparatus with commercially available laser systems. The device can be tuned over a wide spectral range without risking optical damage, is small in size, and simple to align and to operate. This apparatus can be useful for research, medical and industrial applications.

While the above description contains many specificities, the reader should not construe these as limitations on the scope of the invention, but merely as an exemplification of a preferred embodiment thereof. Those skilled in the art will envision many other possible variations that are within its scope.

For example, other non-linear crystals could be used such as LBO, KTP, Lithium Niobate, KTA, CLBO, $LiIO_3$, RTA and others. The cavity could contain more than one crystal. The wavelength of the pump laser could be another harmonic of the Nd:YAG laser, such as the second harmonic at 532 nm, or the fourth at 266 nm, or it could the wavelength of any other laser source. The optical components of the OPO may be fabricated from a range of optical materials such as BK7 glass, fused silica, $CaF_2$ etc., and may be coated with multilayer reflective or anti-reflective coatings, as appropriate to their function, to optimize the OPO performance. The output coupler could be a wedge output coupler so that only the reflection from one surface is fed back into the cavity. The output coupler could have a reflective coating on the side toward the crystal and an anti-reflective coating on the other side. The prism and the crystal could be provided with anti-reflective coatings.

Applicants prefer precision of 30 arc seconds on the right angle prism but less precision would be adequate in many applications and in some cases, to minimize costs, tolerances as large as a few minutes of arc may be tolerated. The knife edge preferably should be very sharp with precision in the range of about 20 microns but less precision will work with some decrease in performance.

In the preferred embodiments the oscillator was tuned by pivoting the crystal. The reader should recognize that in some applications tuning will not be required and the crystal can be maintained in a fixed position. Also, some tuning is possible using temperature changes or by applying a voltage across the crystal.

What is claimed is:

1. An optical parametric oscillator for converting wavelength of a laser pump beam into a signal beam and an idler beam, said oscillator comprising:
   A) a resonance cavity defined by:
      1) a knife edge right angle prism defining a right angle knife edge and configured to serve as a maximum reflector for said idler beam, said signal beam and said pump beam, and
      2) an output coupler;
   B) at least one non-linear crystal positioned within said resonance cavity;
   C) a pump beam deflector positioned to deflect the pump beam into the resonance cavity, through said at least one non-linear crystal and in a direction toward said right angle knife edge;
wherein said pump beam is deflected into said resonance cavity, passes through said at least one non-linear crystal along a path defining a first path and a first direction, is retro-reflected by said right angle prism, passing a second time, along said first path in a second direction opposite said first direction, through said at least one non-linear crystal, and is converted at least partially into said signal and idler beams on both passes through said at least one non-linear crystal.

2. An oscillator as in claim 1 wherein said at least one non-linear crystal is $BaB_2O_4$ crystal.

3. An oscillator as in claim 1 wherein said crystal is pivotably positioned within said resonance cavity.

4. An oscillator as in claim 1 wherein said output coupler is an uncoated optical element having two surfaces parallel to each other.

5. An oscillator as in claim 4 wherein said uncoated optical element is comprised of sapphire.

6. An oscillator as in claim 1 wherein said pump beam deflector is a mirror defining a first side and a second side and having a coating on said first side configured to provide very high reflection of said pump beam and to provide very high transmittal of said signal beam and said idler beam.

7. An oscillator as in claim 6 wherein said pump beam deflector is located inside said resonance cavity.

8. An oscillator as in claim 6 wherein said pump beam deflector is located outside said resonance cavity.

9. An oscillator as in claim 1 and further comprising a line-narrowing element disposed inside said resonance cavity.

10. An oscillator as in claim 9 wherein said line narrowing element comprises a grating.

11. An oscillator as in claim 9 wherein said line narrowing element comprises an etalon.

12. An oscillator as in claim 9 wherein said line narrowing element comprises at least one prism.

13. An oscillator as in claim 12 wherein said output coupler comprises a grating and a mirror arranged in a Littman configuration.

14. An oscillator as in claim 1 wherein said at least one non-linear crystal is LBO crystal.

15. An oscillator as in claim 1 wherein said at least one non-linear crystal is a KTP crystal.

16. An oscillator as in claim 1 wherein said output coupler comprises an optical element having a reflective coating on one side and an anti-reflective coating on the other side.

17. An oscillator as in claim 1 wherein said output coupler is a wedge having one reflecting surface.

18. An oscillator as in claim 17 wherein said reflecting surface is a coated surface.

19. An oscillator as in claim 1 wherein said prism defines a hypotenuse that is coated with an anti-reflective coating.

20. An oscillator as in claim 1 wherein said crystal is coated with an anti-reflective coating.

21. An oscillator as in claim 1 and further comprising a narrow band light source for injecting a seed beam into said resonance cavity.

22. An oscillator as in claim 1 wherein said right angle prism comprises two surfaces intersecting to define a knife edge.

23. An oscillator as in claim 1 wherein said crystal is fixed in position.

24. An oscillator as in claim 1 wherein said crystal is positioned pivotably to tune the oscillator.

25. An oscillator as in claim 1 and further comprising a thermal means to change temperature of said crystal to tune the oscillator.

26. An oscillator as in claim 1 and further comprising a voltage means to apply a voltage to said crystal to tune the oscillator.

* * * * *